United States Patent
Kulseth et al.

(10) Patent No.: US 7,139,560 B2
(45) Date of Patent: Nov. 21, 2006

(54) STIMULUS-DEPENDENT ELECTRONIC DEVICE

(75) Inventors: Paul Michael Kulseth, New Richland, MN (US); Peter Alan Blakeley, Savage, MN (US)

(73) Assignee: Advanced Wireless Communications, Lakeville, MN (US)

( * ) Notice: Subject to any disclaimer, the term of this patent is extended or adjusted under 35 U.S.C. 154(b) by 527 days.

(21) Appl. No.: 10/028,737

(22) Filed: Dec. 19, 2001

(65) Prior Publication Data

US 2003/0114143 A1    Jun. 19, 2003

(51) Int. Cl.
*H04M 3/00*    (2006.01)
(52) U.S. Cl. ............. 455/420; 455/418; 455/410; 455/456.1; 455/419; 340/10.33; 340/10.5; 340/572.1
(58) Field of Classification Search .......... 455/420, 455/418, 410, 456.1, 41 G; 340/10.33, 10.5, 340/572.1
See application file for complete search history.

(56) References Cited

U.S. PATENT DOCUMENTS

| | | | | |
|---|---|---|---|---|
| 5,565,857 A * | 10/1996 | Lee | ............ | 340/5.42 |
| 5,949,350 A * | 9/1999 | Girard et al. | ......... | 340/825.49 |
| 6,150,948 A * | 11/2000 | Watkins | ............ | 340/693.3 |
| 6,151,276 A * | 11/2000 | Peinetti | ............ | 367/139 |
| 6,525,648 B1 * | 2/2003 | Kubler et al. | ......... | 340/10.33 |
| 6,726,099 B1 * | 4/2004 | Becker et al. | ......... | 235/380 |
| 6,903,682 B1 * | 6/2005 | Maddox | ......... | 342/357.06 |
| 6,923,146 B1 * | 8/2005 | Kobitz et al. | ......... | 119/721 |
| 2002/0039916 A1 * | 4/2002 | Hosoi | ......... | 455/572 |
| 2002/0149468 A1 * | 10/2002 | Carrender et al. | ......... | 340/5.61 |

* cited by examiner

*Primary Examiner*—Danh Cong Le
(74) *Attorney, Agent, or Firm*—Merchant & Gould P.C.

(57) ABSTRACT

Herein is disclosed a method, system, and apparatus for dettering theft of portable electronice devices. A portable electronic device is rendered incapable of properly operating after being powered down, without at least some exposure for some time to a given stimulus during a subsequent power-up sequence. A source of the stimulus is provided within a locality from which the devices are not to be removed. Transmission of the stimulus is limited to a region of space within the locality.

16 Claims, 9 Drawing Sheets

STIMULUS-DEPENDENT ELECTRONIC DEVICE

FIELD OF THE INVENTION

This application relates generally to theft control schemes for portable electronic devices, and more particularly to portable electronic devices employed in a defined setting.

BACKGROUND OF THE INVENTION

Many retail and warehouse facilities disseminate two-way radios among their employees to facilitate their operations. For example, a large retail facility may distribute two-way radios to each of its customer-service personnel, so that they may be alerted in the event that a particular customer is in need of assistance. In such an event, a transmission is broadcast to radios carried by each of the customer-service personnel, and a particular customer service representative responds by transmitting his intention to assist the client in need, so that the remaining representatives can pursue other activities. Two-way radios are used because they promote efficiency, yet are relatively inexpensive, reliable, and allow for simple one-to-many communication.

A particular drawback to the use of two-way radios in retail settings is that they are prone to employee theft. Such theft can prove expensive over time. For example, a major retail store may require as many as fifty or more radios. Over the duration of a year, as much as a third of those radios are stolen by employees (or others) for private use. These radios must be replaced at significant expense to the retailer.

One theft prevention strategy that has been employed in the past is to design the two-way radios to transmit on a first frequency, but receive on a second frequency. Thus, without the aid of another device, none of the radios can receive the transmission of another radio. To permit communication within the retail store, a repeater is employed. The repeater receives the radio transmissions on the first frequency and re-transmits those transmissions on the second frequency, so that they may be received by the radios in the retail space. Once out of range of the repeater, the radios are inoperative, because they are unable to communicate with each other. Thus, the motivation for stealing the radios is eliminated.

The above-described repeater scheme possesses certain drawbacks, however. In a retail setting, two-way radios may be used amongst stock room personnel, amongst security personnel, and amongst greeters. Oftentimes, each group of personnel is assigned their own frequency for transmission (one frequency for security personnel, and another frequency for customer service personnel, for example). For the above-described repeater scheme to work in such a setting, multiple repeaters need to be deployed, each operating on a unique set of frequencies. Such a scheme is expensive to establish and expensive to maintain, because of frequency variations from store to store.

As is evident from the preceding discussion, there is a need for a simple, inexpensive scheme for deterring theft of two-way radios from retail settings. A desirable scheme is able to work with existing radios in a convenient and cost-effective manner.

SUMMARY OF THE INVENTION

Against this backdrop the present invention has been developed. A two-way radio may be rendered dependent upon exposure to a stimulus for proper operation, after it has been powered down. Such an electronic device includes operational circuitry of the radio for reception and transmission of a radio signal and a power source that provides power to the operational circuitry. A stimulus-sensitive switch is interposed between the power source and the operational circuitry. The stimulus-sensitive switch is configured to remain closed upon initial exposure to a given stimulus, until such time as the radio is powered down.

According to another embodiment of the invention, a power-up sequence of a two-way radio is governed by a method. The method includes interrupting flow of electrical current from a battery within the radio, with a non-mechanically actuatable switch. Upon initial exposure to a given stimulus, the switch is closed, thereby permitting electrical current to flow from the battery and allowing the power-up sequence to take place.

According to yet another embodiment of the invention, a power-up sequence of a two-way radio with an embedded processor is governed by a method. The method includes instructing the microprocessor to enter an inactive state, upon power-up of the radio. The microprocessor is instructed to remain in the inactive state, until a particular stimulus is received, thereby rendering the radio non-operational. Finally, upon reception of a stimulus, the microprocessor is instructed to exit the inactive state and to execute a sequence of instructions for operating the radio.

According to yet another embodiment of the invention, deterrence of theft of an electronics device may be achieved according to a method. The method includes rendering operation of a portable electronic device dependent upon a given stimulus, so that the device is inoperable without at least some exposure for some time to the given stimulus. A source of the stimulus is provided within the locality. Transmission of the stimulus is limited to a region of space within the locality.

According to yet another embodiment of the invention, deterrence of theft of an electronice device may be achieved according to a method. The method includes rendering a portable electronic device incapable of properly operating after being powered down, without at least some exposure for some time to a given stimulus during a subsequent power-up sequence. A source of the stimulus is provided within the locality. Transmission of the stimulus is limited to a region of space within the locality.

DETAILED DESCRIPTION

Theft of portable electronic devices, such as two-way radios, may be deterred by rendering their power-up sequences dependent upon initial exposure to a pre-determined stimulus. For example, a two-way radio may be designed to possess a stimulus-sensitive switch, such as a hall-effect switch, that remains open until initial exposure to a given stimulus. By inserting that switch in a circuit critical to the operation of the two-way radio (in between the radio's battery and the rest of its circuitry, or in series with the radio's speaker, antenna, microphone, or voltage regulator, for example), the radio is inoperative until it is exposed to the stimulus. The stimulus-sensitive switch may be composed of more than one switch, and may be arranged so that it remains closed (until powering down of the device) after a single, brief exposure to the stimulus. Accordingly, per such a scheme, after a radio has been turned off, it cannot properly function until it is turned on and brought to the source of the stimulus for exposure thereto. By providing the source of stimulus only within the confines of the locality in which the radios are to operate, motivation to steal the radios is eliminated, because, once powered down, the radios will not function until returned to the locality for exposure to the stimulus.

Rendering of a power-up sequence dependent upon exposure to a stimulus need not be accomplished with a switch. Other approaches exist, such as programming the device to enter an inactive state, upon powering up; the device remains in the inactive state, until initial exposure to the stimulus. Of course, if the device is controlled with an application-specific integrated circuit (ASIC), rather than with a processor, the ASIC may be designed with such functionality hard-wired therein. Once again, by providing the source of stimulus only within the confines of the locality in which the radios are to operate, motivation to steal the radios is eliminated, because, once powered down, the radios will not function until returned to the locality for exposure to the stimulus.

Figure 1:
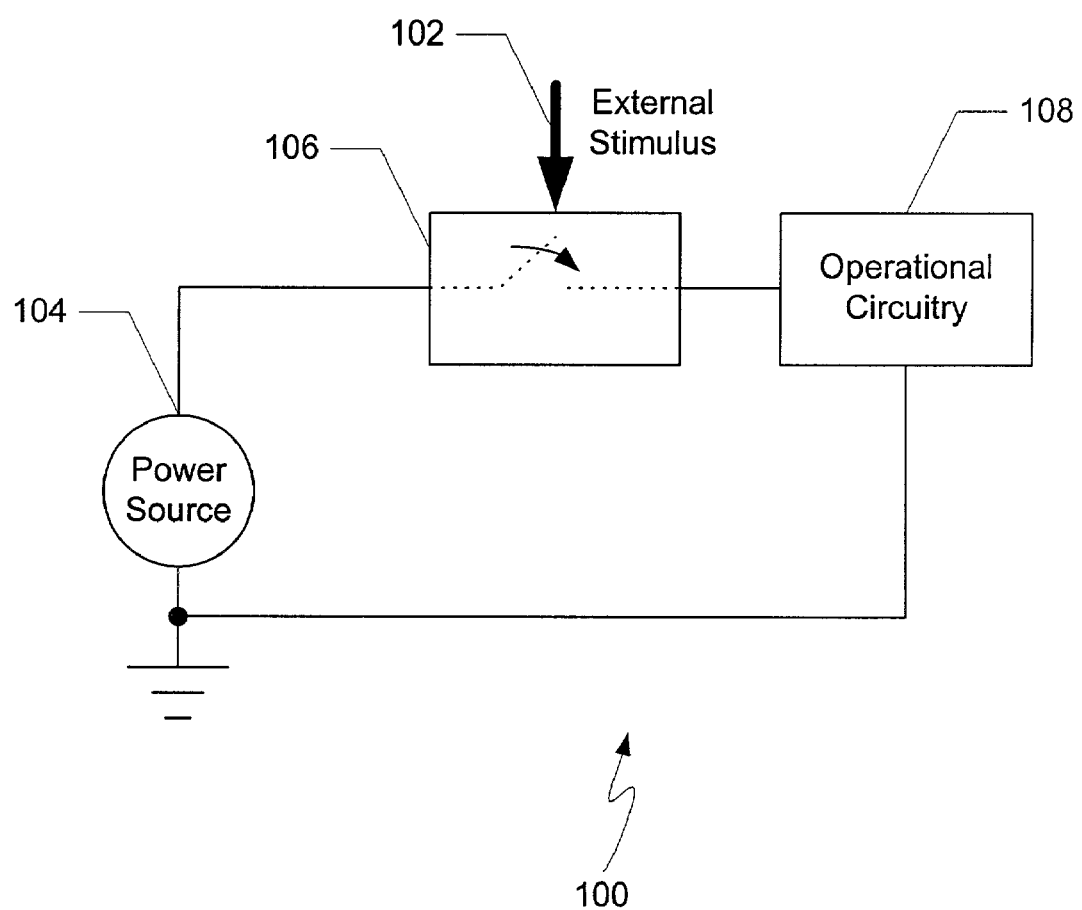
FIG. 1 depicts a high-level schematic of an electronic device configured to require exposure to an external stimulus for its power-up sequence to proceed.

FIG. 1 depicts a high-level schematic of an electronic device 100 configured to require exposure to an external stimulus 102 for its power-up sequence to proceed. The electronic device 100 consists of a power source 104, a stimulus-sensitive switch 106, and operational circuitry 108. The power source 104 provides electrical current to the operational circuitry 108, so that the device 100 can function. The operational circuitry 108 includes all of the circuitry required for the device 100 to operate. For example, in the case of a two-way radio, the operational circuitry 108 may include transmission, reception, and control circuitry, including amplification, modulation, demodulation, and filtering circuits. For a given electronic device 100, the circuits 108 required for operation of the device 100 are known in the art and need not be recited herein, as their precise design generally falls outside of the scope of the present invention.

As can be seen from FIG. 1, the device 100 cannot operate unless the stimulus-sensitive switch 106 is closed (while the switch 106 is open, the operational circuitry 108 is deprived of electrical current). The stimulus-sensitive switch 106 may have many embodiments. For example, the switch 106 may be arranged to close if and only if it is exposed to the given stimulus 102. Thus, for the device 100 to be operational, the device 100 would have to be in the presence of the stimulus 102 at all times. Alternatively, the switch 106 may be configured to close and remain closed upon an initial exposure to the stimulus 102. Per such an embodiment, the device 100 would be rendered operational as soon as it was exposed to the stimulus 102, and it would remain operational until it was powered down.

Figure 3:
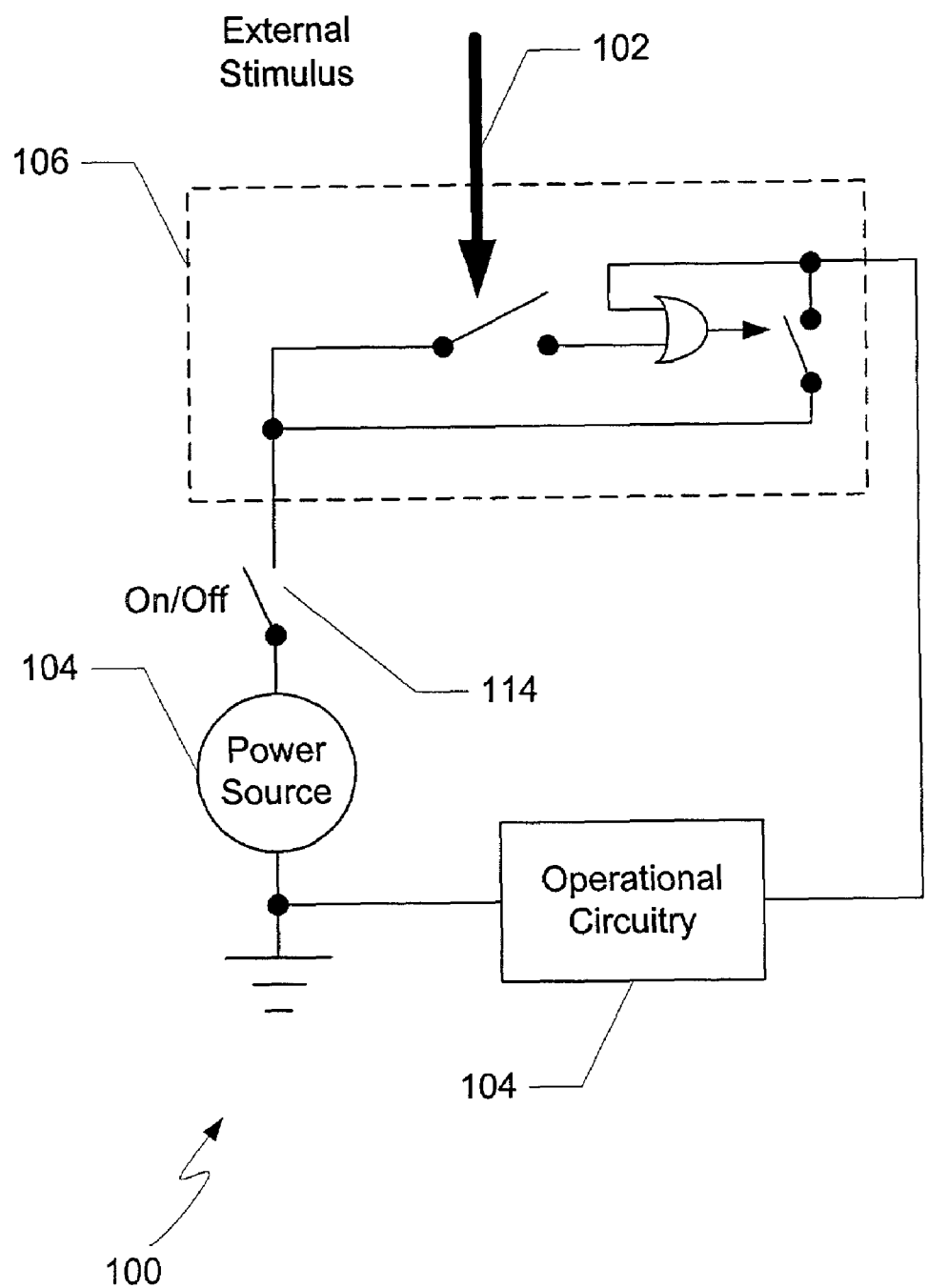
FIG. 3 depicts a high-level schematic of an electronic device configured with an on/off switch connected in series with a stimulus-sensitive switch.

The stimulus-sensitive switch 106 may be used in conjunction with an on/off switch (not depicted in FIG. 1; see FIG. 3 for an example of an on/off switch wired in series with a stimulus-sensitive switch 106). The on/off switch may be wired in series with the stimulus-sensitive switch 106, so that powering up of the device 100 requires both manually actuating the on/off switch, and exposing the device 100 to the stimulus 102. Alternatively, the stimulus-sensitive switch 106 may stand alone, so that the device commences its power-up sequence as soon as it is exposed to the stimulus 102. Such a device 100 could be powered down by manual actuation of an off switch (not depicted in FIG. 1).

Various forms of stimuli 102 may be used to activate the switch 106. For example, the stimulus-sensitive switch 106 may be a hall-effect switch, which closes in response to immersion in a magnetic field. In such a case, the stimulus 102 is a magnetic field. Other forms of stimulus may be used, as well. For example, the stimulus 102 may be a radio frequency (RF) transmission, an infrared (IR) transmission, a pulsed magnetic field, or any other form of transmittable energy. Additionally, the switch 106 may require an identification code to be modulated with the RF, IR, or pulsed magnetic transmission, in order for it to close.

Figure 2:
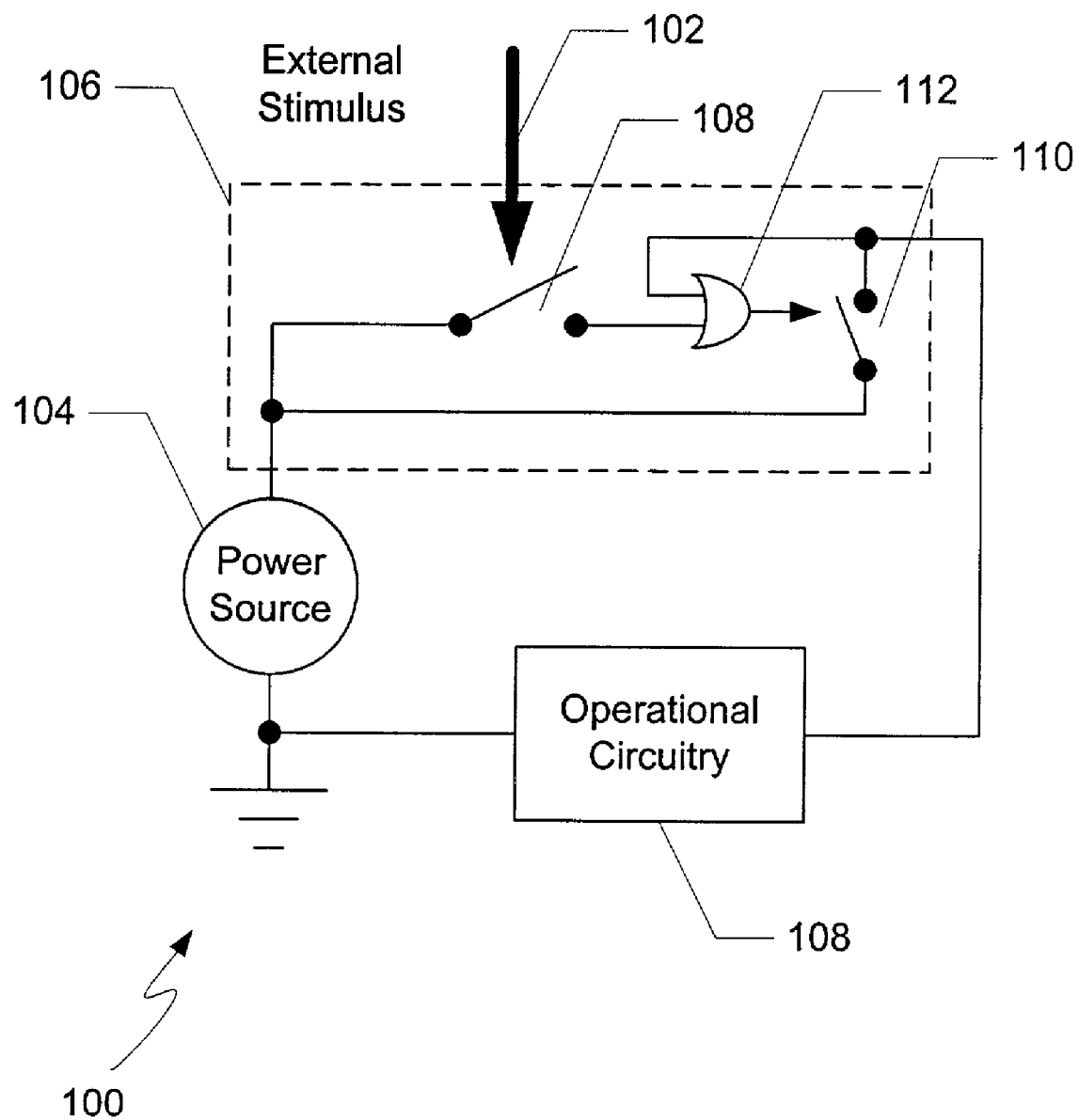
FIG. 2 depicts a high-level schematic of an electronic device configured to be rendered operational as soon as it is exposed to the stimulus.

FIG. 2 depicts a high-level schematic of an electronic device 100 configured to be rendered operational as soon as it is exposed to the stimulus 102. The device depicted in FIG. 2 remains operational thereafter, until it has been powered down.

As shown in FIG. 2, the stimulus-sensitive switch includes more than one switch 108 and 110. Per the embodiment shown in FIG. 2, a first switch 108 is configured to close in response to exposure to the stimulus 102. Closure of the switch 108 permits electrical current to pass through the switch 108 and into a disjunctive summing circuit 112. The disjunctive summing circuit 112 provides an ouput signal, if and only if one of its inputs is asserted. Thus, closure of the first switch 108 results in an output from the summing circuit 112, which, in turn, results in closure of the second switch 110. Closure of the second switch 110 has two effects. First, electrical current is allowed to flow to the operational circuitry 108 of the device 100, so the device is rendered operational. Second, electrical current is fed back into a second input of the disjunctive summing circuit 112, thereby producing an output therefrom, and thereby causing the second switch 110 to remain closed. Accordingly, the stimulus-sensitive switch 106 depicted in FIG. 2 remains closed after a single, brief exposure to the stimulus 102. Consequently, the device 100 remains operational thereafter, until such time as it is powered down.

FIG. 3 depicts a high-level schematic of an electronic device 100 configured with an on/off switch 114 connected in series with the stimulus-sensitive switch 106. Powering up of this device 100 requires two actions. First, the on/off switch 114 must be manually actuated to the "on" position. Second, the device 100 must be exposed, for a single, brief period to the stimulus 102. Thereafter, current flows as described in the embodiment of FIG. 2, and the device 100 remains operational, until it is powered down. Per this embodiment, the device 100 may be powered down by manual actuation of the on/off switch 114 to the "off" position.

Figure 4:
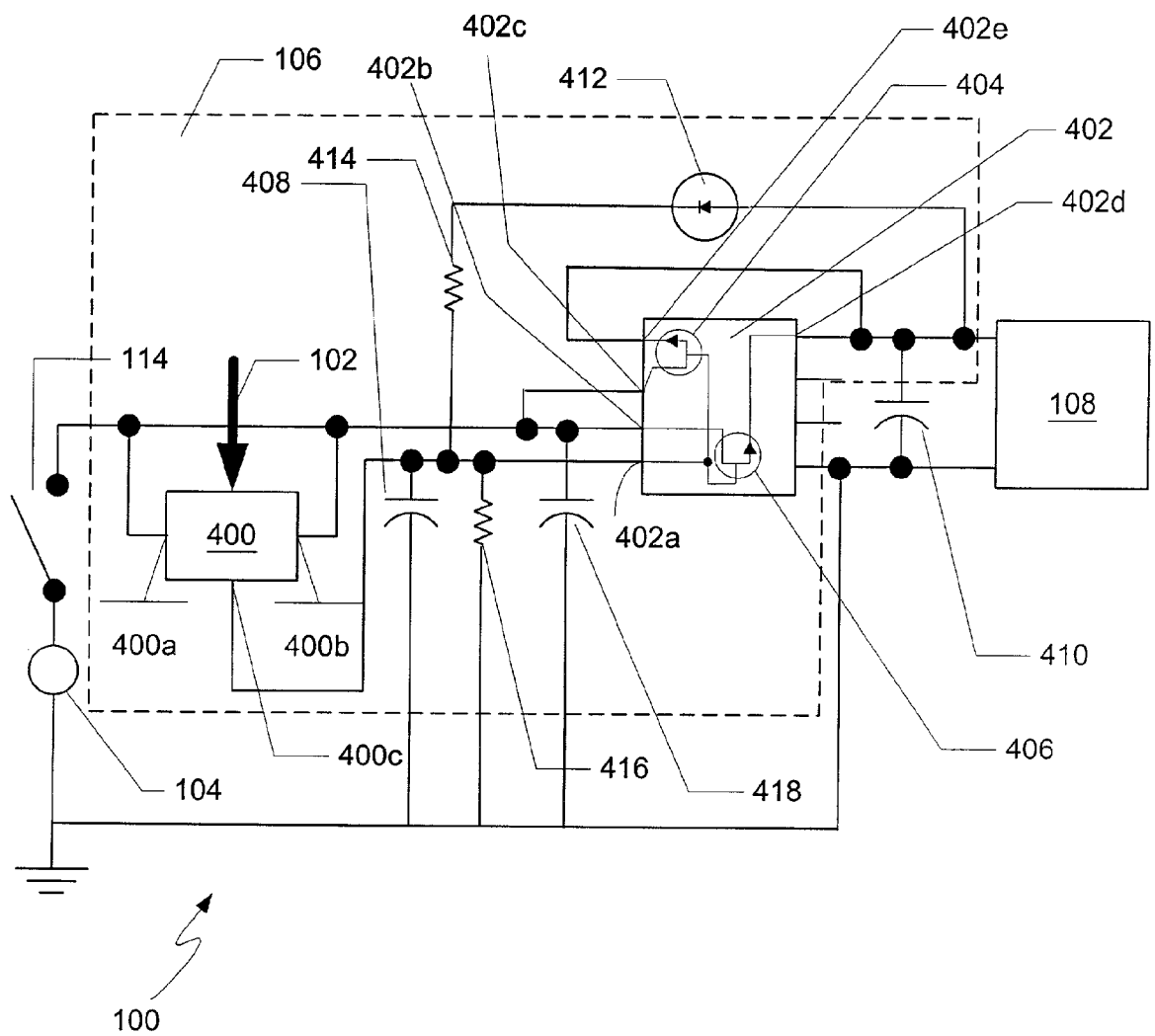
FIG. 4 is a more detailed schematic depiction of one embodiment of the invention shown in FIG. 3.

FIG. 4 is a more detailed schematic depiction of one embodiment of the invention shown in FIG. 3. As in FIG. 3, the power source 104, stimulus-sensitive switch 106, operational circuitry 108, and on/off switch 114 are connected in series. In this embodiment, the stimulus-sensitive switch 106 is designed to remain closed after an initial, brief exposure to the stimulus 102.

As shown in FIG. 4, the stimulus-sensitive switch 106 includes a hall-effect switch 400. The hall-effect switch 400 contains three pins: inputs 400*a* and 400*b*, and output 400*c*. When immersed in a magnetic field, the hall-effect switch 400 closes, so that inputs 400*a* and 400*b* are connected to output 400*c*. Thus, when closed, current flows through the switch 400, through the output pin 400*c*, and to an input pin 402*a* of integrated circuit 402. The integrated circuit 402 is a single chip containing three field effect transistors (FETs), two of which are shown in FIG. 4. The input pin 402*a* is connected to the gate of each FET 404 and 406 within the integrated circuit 402. The power supply 104 is coupled to the source of each FET 404 and 406, through input pins 402*b* and 402*c*. Thus, when the hall-effect switch 400 is immersed in a magnetic field, a voltage is developed on the gate of each FET 404 and 406. Consequently, a conduction path within each FET 404 and 406 is created, permitting current to flow through each FET 404 and 406 and to the operational circuitry 108, via output pins 402*d* and 402*e* (which are connected to the drains of the FETs 404 and 406). A second consequence of current flowing through the FETs 404 and 406 is that the current is permitted to flow back through the diode 412, returning to the input pin 402*a*, thereby keeping both FETs "on." The resistors 414 and 416 cooperate to form a voltage divider, ensuring that the voltage present at input pin 402*a* exceeds the threshold voltage of the FETs, so that they will be kept "on." Capacitors 408, 418, and 410 are connected between ground and the gates, sources and drains of the FETs 404 and 406 for the purpose of suppressing transient effects.

Although the embodiment depicted in FIG. 4 shows two FETs 404 and 406 connected in parallel as the means of passing current to the operational circuitry 108, any number of FETs may be connected in parallel to accomplish this task (the greater the number of FETs connected in parallel, the greater the total current delivering capacity). Furthermore, other forms of switches may be used in place of the FETs 404 and 406, including switches made from more than one FET, switches made from a single bipolar junction transistor (BJT), or switches made from multiple BJTs.

Figure 5:
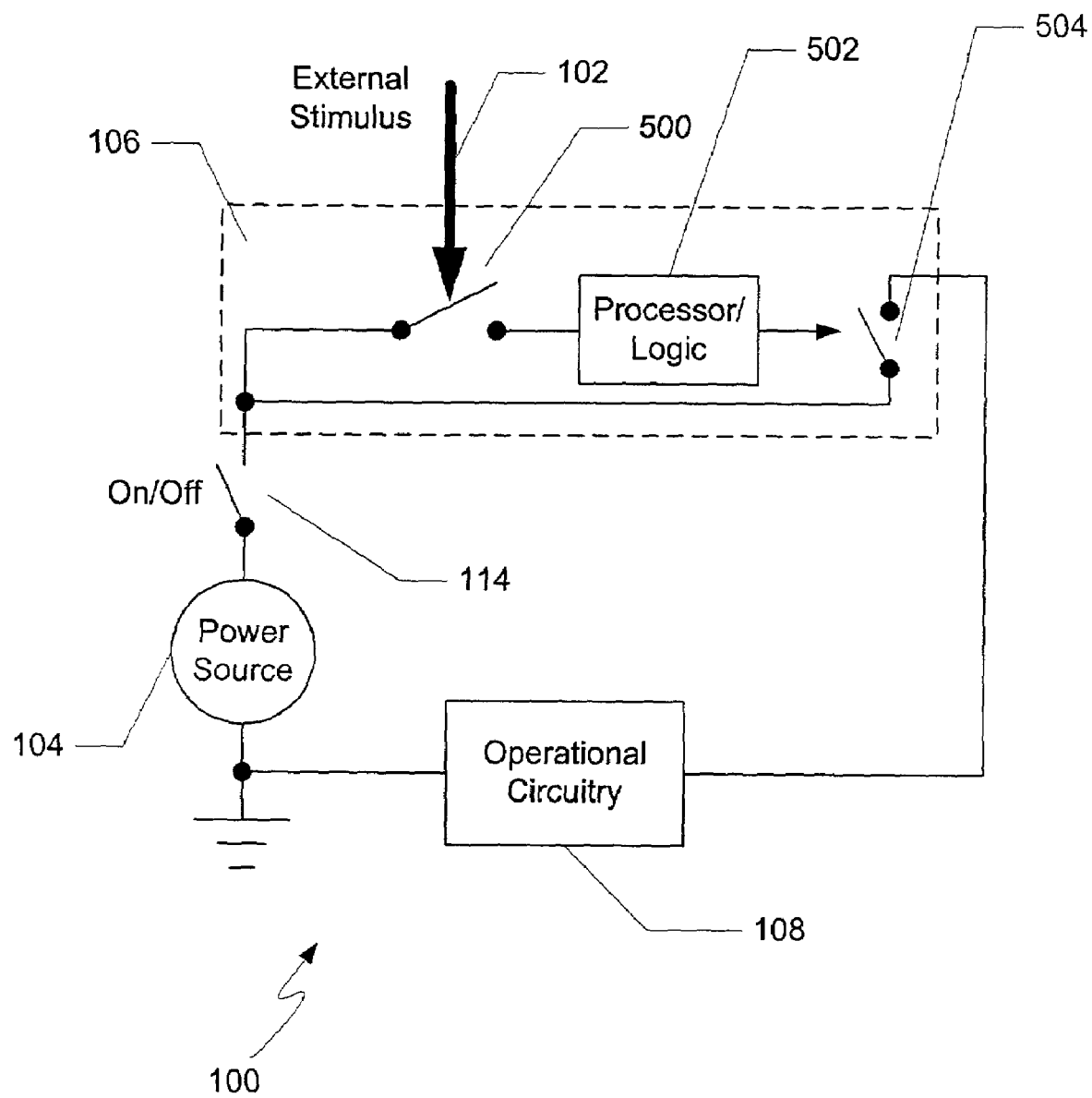
FIG. 5 depicts a high-level schematic of an electronic device, according to yet another embodiment of the present invention.

FIG. 5 depicts a high-level schematic of an electronic device 100, according to yet another embodiment of the present invention. As in previous embodiments, the power source 104, stimulus-sensitive switch 106, operational circuitry 108, and on/off switch 114 are connected in series. In this embodiment, the stimulus-sensitive switch 106 is designed to remain closed after an initial, brief exposure to the stimulus 102.

The stimulus-sensitive switch 106 of FIG. 5 is composed of a first switch 500, a microprocessor 502, and a second switch 504. When the first switch 500 is exposed to the stimulus 102, the switch 500 closes, thereby permitting current to pass to the microprocessor 502. In response to having received the current, the microprocessor 502 may be programmed to deliver an output signal to the second switch 504, causing that switch 504 to close. Because the second switch 504 is interposed between the power source 104 and the remainder of the device's circuitry 108, the remainder of the circuitry 108 is supplied with power, thereby permitting proper operation of the device 100.

One skilled in the art understands that the interface between the first switch 500 and the microprocessor 502 may involve signal-conditioning circuits (level shifters and the like), which are known in the art. The interface may be accomplished through connection with an input port of the microprocessor 502. Similarly, one skilled in the art understands that the interface between the microprocessor 502 and the second switch 504 may take place via an output port, and may involve use of a driving circuit for generating the proper voltage/amperage to close the switch 504.

Optionally, the microprocessor 502 may be programmed to require a predetermined sequence of input pulses before commanding the second switch 504 to close. For example, the first switch 102 may be a hall-effect switch, which closes in response to immersion in a magnetic field. The microprocessor 502 may require the magnetic field to be pulsed in a predetermined sequence, before commanding the second switch 504 to close. Thus, per such an embodiment, a coded stimulus 102 may be implemented for activating the device 100.

One skilled in the art understands that the microprocessor 502 may be embodied as an ASIC that is hardwired to perform the above-described functionality.

Figure 6:
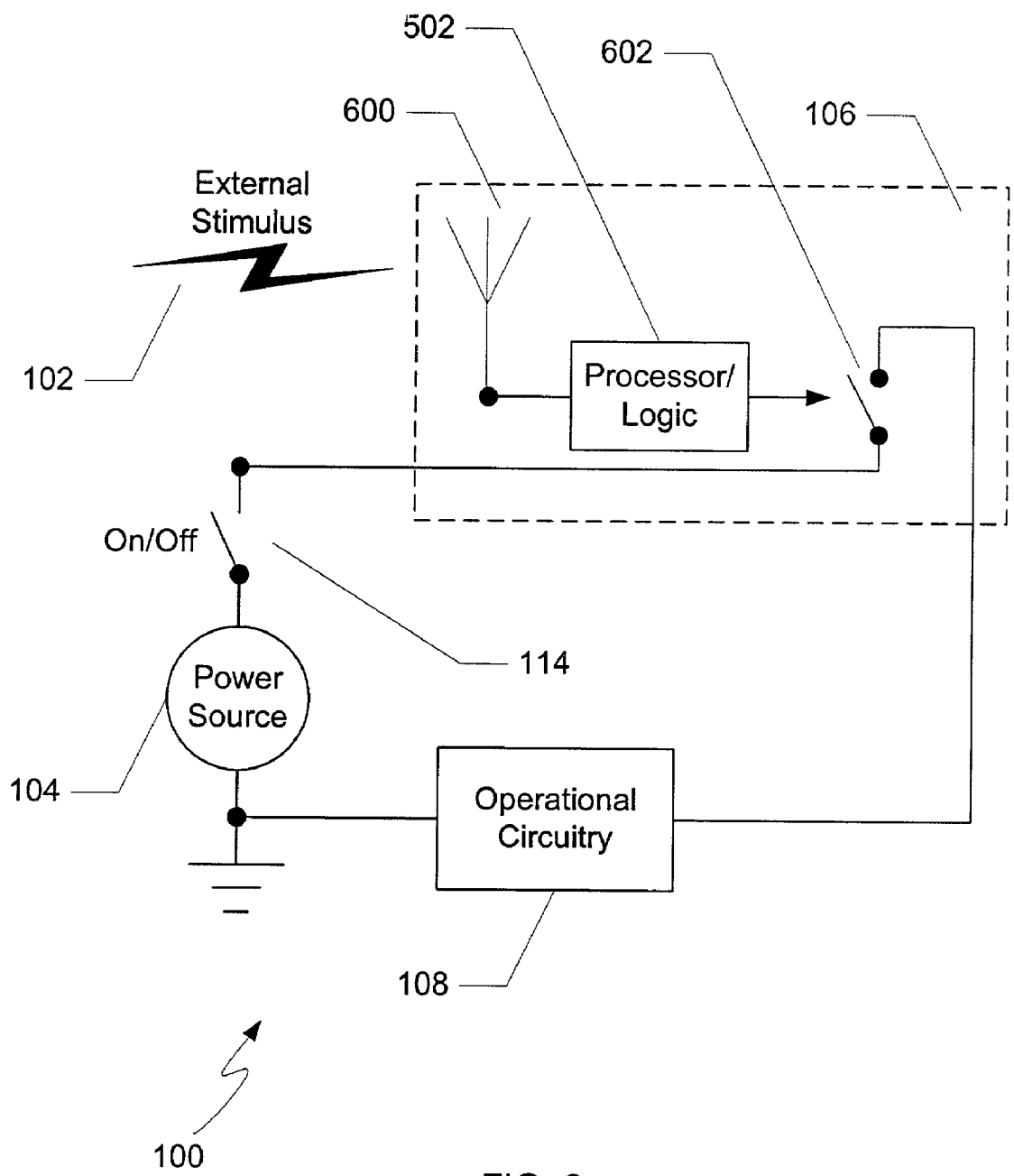
FIG. 6 depicts a high-level schematic of an electronic device 100, according to yet another embodiment of the present invention.

FIG. 6 depicts a high-level schematic of an electronic device 100, according to yet another embodiment of the present invention. As in previous embodiments, the power source 104, stimulus-sensitive switch 106, operational circuitry 108, and on/off switch 114 are connected in series. In this embodiment, the stimulus-sensitive switch 106 is designed to remain closed after an initial, brief exposure to the stimulus 102.

The stimulus-sensitive switch 106 of FIG. 6 is composed of reception circuitry 600 coupled to a microprocessor 502 that is interfaced with a switch 602. The switch 602 is interposed between the power source 104 and the remainder of the device's circuitry 108. The reception circuitry 600 may include an antenna, demodulation/recovery circuitry, filtering circuitry, and interface circuitry (such as an analog-to-digital converter) to permit the received data to be communicated to the processor 502. Such circuitry is known in the art and requires no further explanation. The microprocessor 502 may be programmed to await a particular stimulus signal 102 before commanding the switch 602 to close (thereby providing electrical current to the remainder of the circuitry 108). For example, the stimulus 102 may be an IR or RF signal upon which a specific code is modulated. In such a case, the reception circuitry 600 demodulates the received stimulus 102 and communicates the recovered code to the microprocessor 502. The microprocessor 502 may be programmed to await reception of a certain code (such as a code identifying the particular device) before commanding the switch 602 to close. Thus, each device (such as a two-way radio) may have an identification code stored in memory; the micrprocessor 502 does not close the second switch 602 until receiving a code that matches the particular identification code stored in memory.

Figure 7:
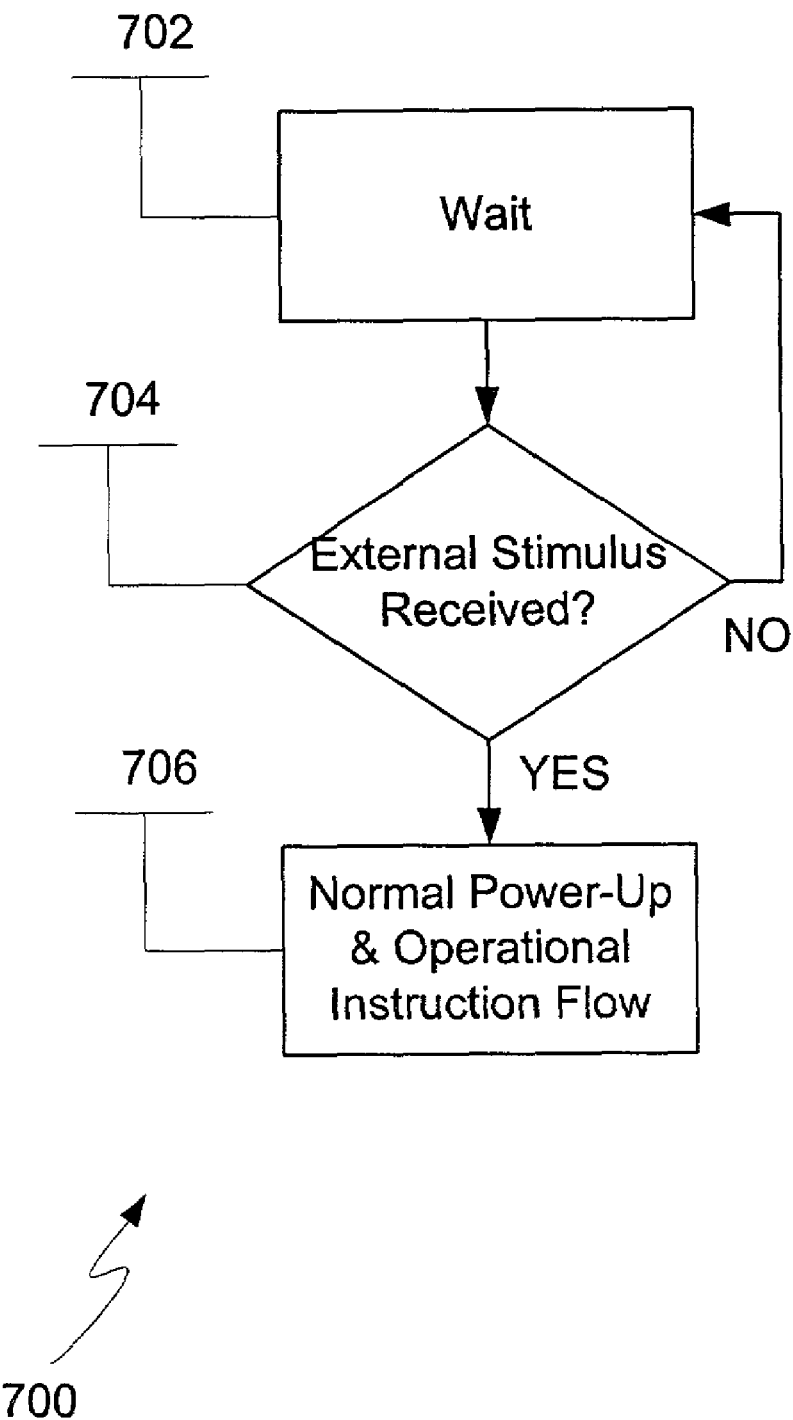
FIG. 7 depicts a sequence of instructions that may be executed by an embedded processor within the device, according to one embodiment of the present invention.

FIG. 7 depicts a sequence of instructions 700 which may be executed by an embedded processor within the device 100, according to one embodiment of the present invention. According to this embodiment, the device 100 includes an embedded processor that controls the operation of the device 100. The processor referred to may be the microprocessor 502 depicted in FIGS. 5 and 6, or may be included as part of the operational circuitry 108 depicted in FIGS. 1–6.

As can be seen from FIG. 7, upon power up, the embedded processor may be programmed to enter an inactive state 702, in which the processor is dormant until reception of the stimulus 102 is announced to the processor. In query operation 704, the microprocessor determines whether the stimulus 102 has been received. If not, the microprocessor returns to its inactive state 702. If, on the other hand, the stimulus 102 has been received, the processor is permitted to execute the remainder of the software/firmware 706 required for normal operation of the device 100. Accordingly, the device is rendered non-functional until a brief, initial exposure to the stimulus 102. Thereafter, the device 100 remains functional, until powered down.

Figure 8:
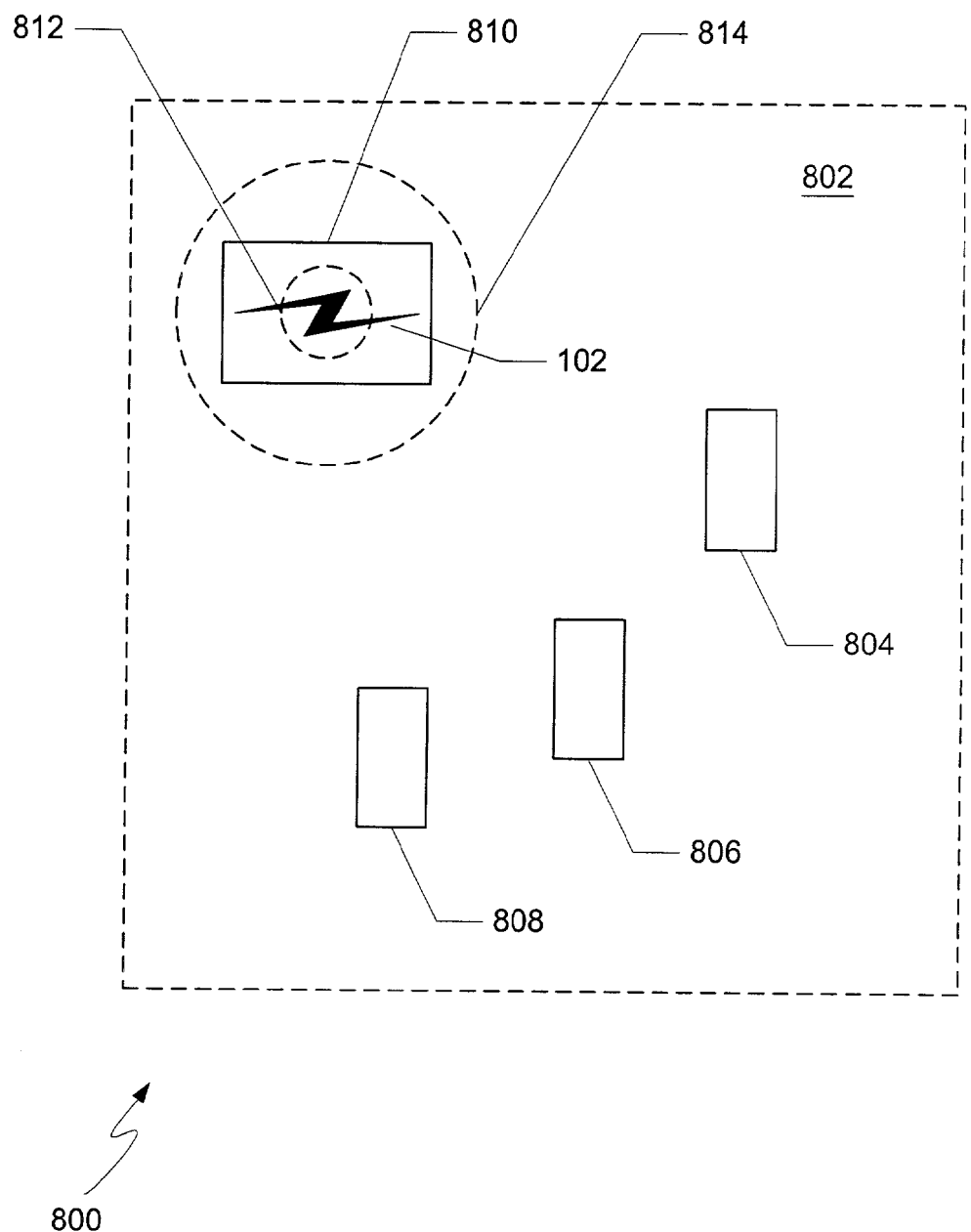
FIG. 8 depicts a system that employs embodiments of the device depicted in FIGS. 1–7.

FIG. 8 depicts a system 800 that employs embodiments of the device 100 depicted in FIGS. 1–7. The system 800 includes a locality 802 in which the electronic devices 804, 806, and 808 are to operate. For example, the locality 802 may be a retail space or a warehouse. The system 800 discourages removal of the devices 804, 806, and 808 from the locality 802. Further included in the system 800 is a stimulus source 810, which provides a stimulus 102 that is used to permit the various devices 804, 806, and 808 to operate properly after having been powered down. The devices 804, 806, and 808 may be designed according to the embodiments depicted according to FIGS. 1–7.

The stimulus source 810 produces a stimulus 102 used to activate the devices 804, 806, and 808, as discussed throughout the application. The stimulus 102 may take the form of an electromagnetic signal that propagates through space. If so, the signal should be confined to extend not further than a region of space approximately coextensive with the locality 802 in which the devices 804, 806, and 808 are to operate. Alternatively, the stimulus source 810 may be designed to transmit such a stimulus 102 in a region of space 814 immediately surrounding the source 810. As a third alternative, the stimulus 102 may be confined to a region of space 812 within the source 810, itself. Per such an embodiment, a device 804, 806, and 808 is partially inserted into the source 810 for exposure to the stimulus 102.

As described earlier, the system 800 eliminates the motivation to steal the devices 804, 806, and 808, because, once powered down, the devices 804, 806, and 808 must be brought to the stimulus source 810 to be rendered operational.

Figure 9:
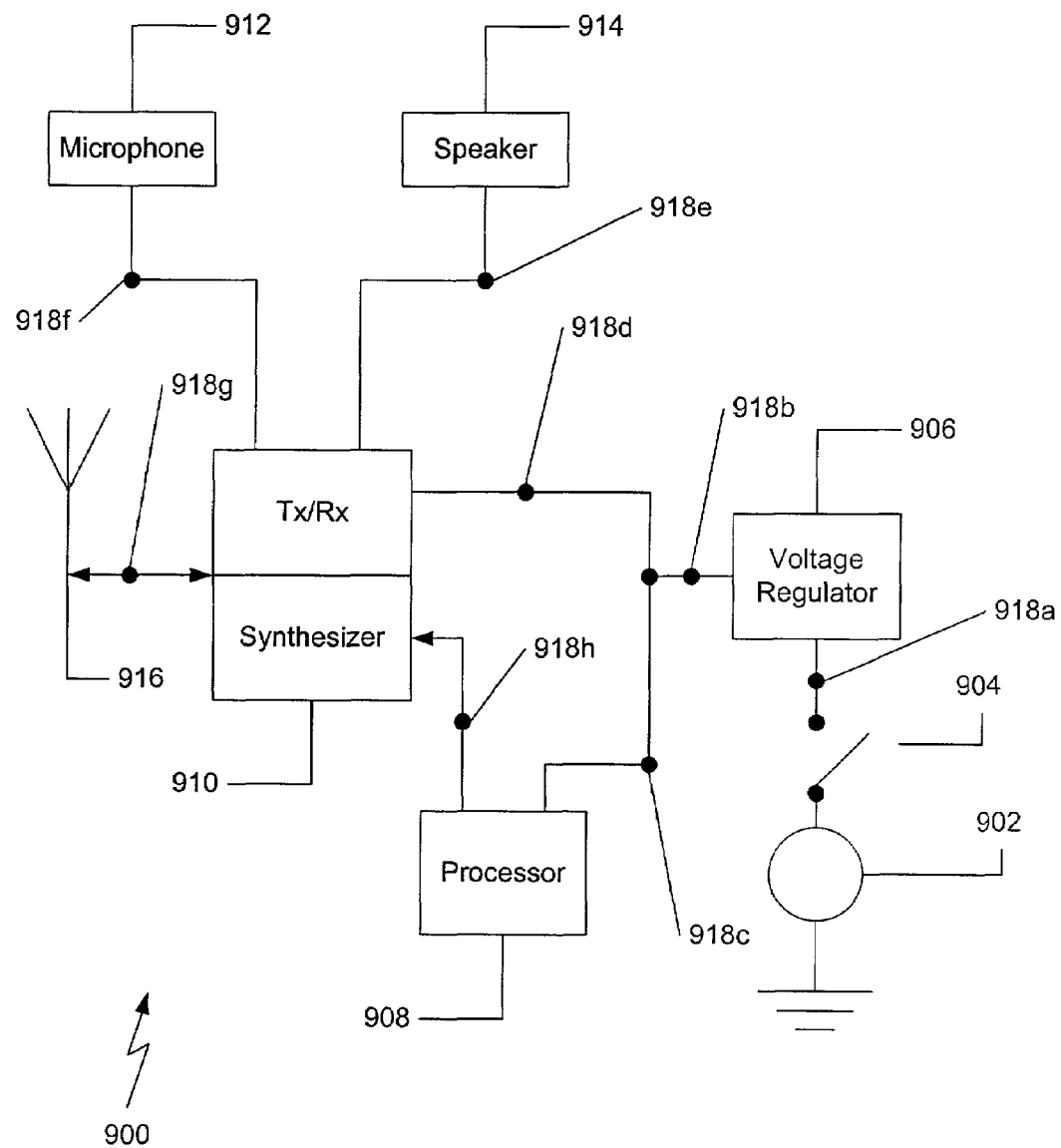
FIG. 9 depicts a high-level schematic of a two-way radio, in which exemplary points for introduction of a stimulus-dependent switch are identified.

FIG. 9 depicts a high-level schematic of a two-way radio 900, in which exemplary points 918a–h for introduction of a stimulus-dependent switch 106 are identified.

The radio 900 includes a power source 902, such as a battery or battery pack, coupled to a voltage regulator 906 through an on/off switch 904. The voltage regulator maintains a particular voltage on power lines within the radio 900. For example, digital logic oftentimes runs off of five-volt power lines. Thus, the voltage regulator 906 may be designed to yield a five-volt output, with which the circuitry within the radio 900 is powered. In the particular embodiment depicted in FIG. 9, the voltage regulator 906 provides power to a processor 908 and to transmission/reception/synthesizing circuitry 910.

The processor 908 provides general control for the two-way radio, and is an exemplary site for execution of the method described with reference to FIG. 7. The processor 908 controls such features as the frequency of transmission and/or the introduction sub-audible tones into the transmission stream. As can be seen from FIG. 9, the processor 908 communicates data to the transmission/reception/synthesizing circuitry 910, which operates based upon the data received therefrom. For example, the transmission/reception/synthesizing circuitry 910 generates a carrier frequency and modulates voice data against that frequency, based upon data from the processor 908.

The transmission/reception/synthesizing circuitry 910 generally performs the tasks necessary for transmission and reception of a radio signal, including production of a carrier signal, modulation, demodulation, amplification, and filtering of transmission and reception signals. The transmission/reception/synthesizing circuitry 910 is coupled to: (1) a microphone 912 for reception of voice data to be modulated against the carrier signal; (2) a speaker 914 for transducing the received and demodulated reception signal into a sound signal; and (3) an antenna 916 for reception and transmission of radio signals.

Broadly speaking, a stimulus-sensitive switch 106 may be interposed in any operation-critical path in a two-way radio 900 (or any other device, for that matter). Such operation-critical sites include, but are not limited to: placement in series with the voltage regulator 906, as shown by reference numerals 918a and 918b; placement in series with the power supply lines for the transmission/reception/synthesizing circuitry 910 or the processor 908, as shown by reference numerals 918d and 918c, respectively; placement in series with the speaker, as shown by reference numeral 918e; placement in series with the microphone 912, as shown by reference numeral 918f; placement in series with the antenna, as shown by reference numeral 918g; or placement in series in the data path between the processor 908 and the transmission/reception/synthesizing circuitry 910, as shown by reference numeral 918h.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the system and devices disclosed herein may utilize any form of stimulus suitable for effective transmission. Additionally, transmission of the stimulus itself may be rendered conditional on an event, such as identification of the particular electronic device to which the source is to transmit the stimulus (for example, the electronic device may be outfitted with an RF identification tag that permits the source to identify the particular device). Per such a modification, the source would transmit the stimulus only if the identification code contained in the RF identification tag was found in a list of approved identification codes. One skilled in the art recognizes that the invention disclosed herein can be used in conjunction with any portable electronic device, including, but not limited to, cordless telephones, cellular telephones or handheld scanners. Numerous other changes may be made which will readily suggest themselves to those skilled in the art and which are encompassed in the spirit of the invention disclosed and as defined in the appended claims.

The claimed invention is:

1. A method of deterring removal of a portable electronic device from a locality, the method comprising:
 (a) rendering operation of the portable electronic device dependent upon a given stimulus, so that the device is inoperable without at least some exposure for some time to the given stimulus, wherein the portable electronic device is a two-way radio, the two-way radio being dependent upon said exposure to the given stimulus for operability;
 (b) providing a source of the stimulus within the locality;
 (c) limiting transmission of the stimulus to a region of space within the locality; and (d) closing a stimulus-sensitive switch of the two-way radio upon said exposure to the given stimulus, until such time as the radio is powered down, the stimulus-sensitive switch being interposed between a power source of the two-way radio and the operational circuitry.

2. The method of claim 1, wherein step (a) comprises:
preempting a power-up sequence, until exposure to the stimulus.

3. The method of claim 1, wherein the portable electronic device is a two-way radio, and wherein step (a) comprises:
disabling reception of a radio signal, until exposure to the stimulus.

4. The method of claim 1, wherein the portable electronic device is a two-way radio, and wherein step (a) comprises:
disabling transmission of a radio signal, until exposure to the stimulus.

5. The method of claim 1, wherein the stimulus is a magnetic field.

6. The method of claim 1, wherein the stimulus is an infrared signal.

7. The method of claim 1, wherein the stimulus is an identification code modulated against a radio frequency carrier signal.

8. The method of claim 1, wherein step (a) comprises interrupting an output of a voltage regulator that powers circuitry within the portable electronic device, until exposure to the stimulus.

9. The method of claim 1, wherein the given stimulus is transmission of a radio signal, the two-way radio including operational circuitry for reception and transmission of the radio signal.

10. The method of claim 9, wherein the two-way radio includes a power source that provides power to the operational circuitry.

11. The method of claim 1, wherein the two-way radio further includes an on/off switch interposed between the power source and the operational circuitry.

12. The method of claim 1, further including:
closing a first switch of the stimulus-sensitive switch in response to said exposure to the given stimulus; and
closing a second switch of the stimulus-sensitive switch in response to closure of the first switch.

13. The method of claim 12, wherein closing the second switch completes a feedback circuit causing the second switch to remain closed.

14. The method of claim 1, wherein the stimulus-sensitive switch is configured to respond to exposure to a magnetic field.

15. The method of claim 1, wherein the stimulus-sensitive switch is configured to respond to exposure to an infrared signal.

16. The method of claim 1, wherein the stimulus-sensitive switch is configured to respond to exposure to a radio frequency signal.

* * * * *